Patented Oct. 23, 1934

1,978,227

UNITED STATES PATENT OFFICE 1,978,227

PROCESS FOR BREAKING PETROLEUM EMULSIONS

Claudius H. M. Roberts, San Marino, Calif., assignor to Tretolite Company, Webster Groves, Mo., a corporation of Missouri No Drawing. Application August 3, 1933, Serial No. 683,478

20 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottom of oil storage tanks, and are commonly referred to as "cut oil", "roily oil", "emulsified oil", and "bottom settlings".

The object of my invention is to provide a novel and inexpensive process for separating emulsions of the character referred to into their component parts of oil and water or brine.

Briefly described, my process consists in subjecting a petroleum emulsion of the water-in-oil type to the action of a treating agent or demulsifying agent of the kind hereinafter described, thereby causing the emulsion to break down and separate into its component parts of oil and water or brine, when the emulsion is permitted to remain in a quiescent state after treatment, or is subjected to other equivalent separatory procedure.

The treating agent used in my process consists of a mixture that comprises sulfur dioxide extract, and a reagent obtained by chemical combination of a reactive long chain hydrocarbon body and a polybasic carboxy acid, either by direct combination, or else through a polyhydric alcohol residue acting as a link, as in the case of oleic acid and phthalic acid, both being combined with glycerol.

The use of chemical reagents derived from a long chain reactive hydrocarbon body and a polybasic acid for breaking water-in-oil emulsions are described in a number of co-pending applications hereinafter referred to. In my co-pending application Serial No. 665,962, filed April 13, 1933, there have been disclosed reagents characterized by the presence of both polyhydric alcohol residues and polybasic carboxy acid residues. Such reagents may be of a simple type in which glycerol combines directly with phthalic acid and is subsequently polymerized. In this present application I do not contemplate the use of this simple type of polyhydric alcohol-polybasic carboxy acid reagent in combination with sulfur dioxide extract, but I do contemplate the use of a reagent in which there is both a polybasic carboxy acid residue and a long chain reactive hydrocarbon residue. In said co-pending application Serial No. 665,962 suitable reactive long chain hydrocarbons include oleic acid, stearic acid, hydroxystearic acid, cetyl alcohol, cetyl sulfonic acid, naphthenic acid, etc. Oleic acid, stearic acid and the like are members of a class of materials commonly referred to as fatty acids and are characterized by having 10 carbon atoms, or more, in the molecule. Cetyl alcohol, not a fatty acid, has 26 carbon atoms in the molecule. To the extent that these materials contain an alcoholiform hydroxyl, as in the case of hydroxystearic acid, they may be combined with a polybasic carboxy acid such as phthalic acid, and then combined with a polyhydric alcohol. To the extent that these materials are acidic in nature, as in the case of oleic acid, they may be combined with a polyhydric alcohol, such as glycerol, and one of the remaining hydroxyls of the polyhydric alcohol may be combined with the polybasic carboxy acid. In my co-pending application Serial No. 683,479, dated August 3, 1933, materials of the same particular class are contemplated for breaking water-in-oil emulsions, except that said latter application is limited to reagents derived from ricinoleic acid bodies, such as ricinoleic acid or castor oil. Likewise, in co-pending application to DeGroote et al., Serial No. 664,210, filed April 3, 1933, there is described the use of similar reagents for the same purpose derived from long chain hydroxylated materials, such as castor oil, and a polybasic carboxy acid, such as phthalic or oxalic acid, but uncombined with any polyhydric alcohol, and thus differentiated from the other materials previously described.

Thus, the use of chemical reagents for resolving water-in-oil emulsions, containing a polybasic carboxy acid residue and a long chain reactive hydrocarbon residue, are well known. I have found that, if said reagents are mixed with sulfur dioxide extract or mixed with a solvent consisting principally of sulfur dioxide extract, one obtains a reagent of unusual effectiveness. Customarily sulfur dioxide extract is not employed to dilute reagents of the type commonly employed for breaking water-in-oil emulsions, as in the oil fields. For instance, modified fatty acids, petroleum sulfo acids, alkylated aromatic sulfonic acids, etc., are diluted with or mixed with various solvents, such as kerosene, solvent naphtha, pine oil, cresylic acids, etc. Sulfur dioxide extract is not used because it does not exhibit any unusual properties in conjunction with the majority of conventional chemical reagents, and other cheaper solvents are available, which give a thinner product, and also a product of a lower cold test. However, I have found that when sulfur dioxide extract is mixed with these reagents derived from polybasic carboxy acids and reactive hydrocarbons, with or without the inclusion of a polyhydric alcohol residue in the molecule, that one obtains a more effective reagent than when other solvents are employed. Sulfur dioxide extract in conjunction with such reagents, appears to exhibit properties akin to those noted in U. S. Patent No. 1,834,940 to De Groote et al., dated December 8, 1931.

The sulfur dioxide extract contemplated by my process in combination with the described reagents, is an oil-soluble substance and it is obtained or produced from petroleum distillates or other suitable hydrocarbon bodies, by means of liquid sulfur dioxide. One source of supply of such material is a by-product or residuum obtained in the operation of purifying petroleum distillates by the well known "Edeleanu process", described in U. S. Patent No. 911,553, to Lazar Edeleanu, dated February 2, 1909. Said Edeleanu process, briefly described, consists in agitating petroleum distillate with liquid sulphur dioxide at a low temperature, and then permitting the mass to separate into two layers, the lower of which is a solution of aromatic and unsaturated compounds in liquid sulfur dioxide. The said solution may also contain any sulfur-containing compounds originally present in the petroleum distillate. After withdrawing the said solution from the reaction vessel, the sulfur dioxide is recovered by driving it off at a higher temperature, leaving a residuum consisting of sulfur dioxide extract. The sulfur dioxide may be re-cycled for further use in the process.

The sulfur dioxide extract, which appears as a residuum of the above mentioned Edeleanu extract, consists of a mixture of compounds which contains only a trace of sulfur dioxide, and it is the said residuum or mixture that I prefer to combine with the previously described reagents, to produce the demulsifying agent contemplated by my process. It contains chiefly aromatic bodies and unsaturated bodies. Some of the aromatics may be mono-cyclic and some polycyclic. Some may be hydrogenated aromatics. The unsaturated bodies may be of the aliphatic or of the cyclic series. In an average sample of residuum or sulfur dioxide extract of the kind above referred to, it is probable that all of these various types are present in larger or smaller quantities, although specific samples would vary in the percentage of each constituent present. For example, if Borneo petroleum distillate were subjected to treatment by the Edeleanu process, the residuum, or sulfur dioxide extract, obtained would be expected to consist largely of aromatic bodies, whereas, if West Texas petroleum distillate were subjected to treatment by the Edeleanu process, the residuum, or sulfur dioxide extract, obtained would contain a smaller proportion of aromatics.

I have found that good results are obtained by suitable combination with sulfur dioxide extract derived from purification of a distillate from West Texas crude petroleum. Approximately 10% of the sulfur dioxide extract could be distilled at a temperature range of 360° F., to 390° F., and as the temperature was increased, the percentage of the sulfur dioxide extract distilled increased in about the following ratio, i. e.:

| Temperature | Percent |
|---|---|
| 390–400° F | 11–20 |
| 401–410° F | 21–30 |
| 411–421° F | 31–40 |
| 422–430° F | 41–50 |
| 431–443° F | 51–60 |
| 444–455° F | 61–70 |
| 456–472° F | 71–80 |
| 473–490° F | 81–90 |
| Above 490° F | 91–100 |

The specific gravity of the sulfur dioxide extract obtained was approximately 0.899 at 60° F. It contained only a trace of bodies extractable by means of sodium hydroxide. Strong sulfuric acid dissolved a portion of it with the evolution of heat. Oleum acted more vigorously, but in a similar fashion. The solution constituting the lower acid layer of the reaction mass contained sulfonic acids or similar bodies soluble in water. By means of 25% by volume of 66° Baumé sulfuric acid, 11% of the sample was dissolved. Since no exact analysis of the material can be made to determine the amount of each member of the various homologous series present, no more complete characterization of the material can be given.

It is to be understood that the reagent for use in the present process is not limited to the reagents specifically disclosed in the three co-pending applications mentioned, but that similar ones, especially those coming within the scope of said applications, may be employed after mixture with the sulfur dioxide extract. For instance, one may employ the sulfur dioxide extract combined with a mixture of reagents such as those described in my co-pending application, Serial No. 665,962, and materials described in co-pending application Serial No. 664,210, to DeGroote, et al., previously referred to. It is understood that such polybasic carboxy acid reagents need not be prepared by adding or combining proportions so that the amounts present are in exact stochiometric proportions, but that there may be an excess of one or more of the raw materials entering into the final reaction, that is, the reagent before dilution with Edeleanu extract may have an excess of the reactive hydrocarbon or fatty body or an excess of the polybasic carboxy acid or an excess of the polyhydric alcohol. Ether alcohols of the polyhydric type, such as diglycerol, may be employed. The reagents may be prepared from processed or blown oil, such as processed or blown castor oil, instead of ordinary castor oil. Indeed, a reagent may be prepared from castor oil by combination with oxalic acid or phthalic acid, with or without union with a polyhydric alcohol, and this material may be subjected to a blowing or oxidation process and may be subsequently mixed with sulfur dioxide extract. Reagents may be prepared from shellac, since it consists largely of trihydroxy pelmitic acid. Materials may be obtained from castor oil by combination with two different polybasic acids, that is, with both oxalic acid and phthalic acid. Acetylated ricinoleic acid may be suitably combined with glycerol and then with phthalic acid. In some instances the reagent may contain small amounts of oxidized or blown or processed castor oil, or castor oil dehydration products of the kind disclosed by Hinrichs in U. S. Patent No. 1,901,163, dated March 14, 1933. Since these materials are esters, they sometimes show the same decomposition reactions of ordinary esters. Inhibitors, such as phenol, may be added to prevent decomposition of material before the sulfur dioxide extract is added, or the inhibitor may be added afterwards. In the same manner that esters can be prepared from acid sulfates of monohydric alcohols, acid sulfates of dihydric alcohols, particularly obtained by mixtures of diolefins and sulfuric acid, may be employed to replace a polyhydric alcohol in certain reactions employed to produce suitable reagents.

It is preferable that sulfur dioxide extract be used as the sole diluent. However, part of the sulfur dioxide extract may be replaced by an ordinary solvent, particularly a non-hydroxy solvent, such as xylene or solvent naphtha. Any non-dissociating solvent, such as pine oil, as distinguished from water or alcohol, is excellent for replacing part of the sulfur dioxide extract, although any suitable alcohol, such as denatured alcohol, may be used, if desired. Generally speaking, in order to obtain the beneficial effect herein described, the amount of sulfur dioxide extract should be equal to at least 50% by weight of the polybasic carboxy acid compound employed. It is most desirable that the polybasic carboxy acid compound be combined solely with sulfur dioxide extract, and in a general way the limits of the mixtures should be within the ratios of 1 to 4 and 4 to 1.

Suitable polybasic carboxy acids for use in preparing the reagent for mixture with the sulfur dioxide extract may be of aromatic, aliphatic, alkyl, aralkyl, cyclic or heterocyclic type, or may be suitable derivatives of the same which do not change their reaction characteristics as polybasic acids and include such polybasic acids as the following:

Succinic, maleic, malic, aconitic, tartaric, citric, fumaric, tricarballylic, trihydroxy-glutaric, mesoxalic, phthalic, diphenic, naphthalic, benzoylbenzoic, trimesic, mellitic, cinchomaronic, quinolinic, camphoric, aspartic, norpinic, glutamic, etc.

Suitable polyhydric alcohols include the following:

Glycerol, ethylene glycol, erythritol, adonitol, mannitol, dihydroxynaphthalene, alizarin, purpurin, terpin, dihydroxy-thiophene, polyglycerols, such as diglycerol, triglycerol, and other polyhydric ether alcohols, such as di-ethylene glycol, etc. In general, suitable polyhydric alcohols may be aliphatic, aromatic, cyclic, aralkyl, heterocyclic, etc., or suitable derivatives of the same which do not change their reaction characteristics as polyhydric alcohols.

Suitable reactive long chain hydrocarbons include the following:

Stearic acid, cetyl alcohol, hydroxystearic acid, oleic acid, linolic acid, petroleum carboxy acids, such as naphthenic acids, rosin carboxy acids such as abeitic acid, ricinoleic acid, castor oil, trihydroxy-palmitic acid, etc., and their salts, esters or derivatives which do not change their reaction characteristics, as previously described. High molecular weight compounds, including cyclic acids, such as naphthenic acids, are considered the equivalent of long chain reactive hydrocarbons.

The preparation of these reagents prior to dilution is relatively simple, and in general, simply a matter of heating within a range of 75 degrees C. to about 250 degrees C. The material produced by the primary reactions may be combined with suitable bases such as ammonium or sodium hydroxide, or with basic amines such as triethanolamine. Water-soluble forms such as sodium or potassium salts may be reacted with metallic salts such as copper sulfate, magnesium or calcium chlorides, ferric chloride, ferrous sulfate, etc., to produce the corresponding water-insoluble metallic salts. The reagent before admixture with sulfur dioxide extract may be water-soluble or oil-soluble, or both. The material may be almost water-insoluble and almost oil-insoluble and simply be soluble to the extent that the reagent is used in contact with emulsion, for instance, one part in twenty thousand.

My preferred reagent is prepared by mixing 300 lbs. of phthalic anhydride with 175 lbs. of diglycerol and 325 lbs. of caster oil and heating at 150° to 250° C. for approximately ten to thirty minutes, after which it is permitted to cool and diluted with twice its weight of sulfur dioxide extract, preferably of the kind described in specific detail as having a specific gravity of 0.899 at 60° F., and a boiling range of 360° F to 490° F. Denatured alcohol equal in weight to half the sulfur dioxide extract is then added, and the entire mass stirred to give a homogeneous mixture. The addition of the alcohol may be omitted, if desired.

One peculiarity of the reagents thus produced by mixture of the described products with sulfur dioxide extract is that, where a water-soluble reagent is diluted with sulfur dioxide extract, the finished product gives optimum results, if the reagent is not diluted with water prior to use. Thus, water-soluble polybasic carboxy acid reagents, particularly those obtained by saponification with caustic soda, caustic potash, or ammonia, and having hydrophile characteristics, will give best results if the finished product after admixture with sulfur dioxide extract is used without dilution, or only dilution with crude oil if the material is oil-soluble or oil-miscible. It should not be diluted with water if maximum results are required. It is to be understood, of course, that either oil-soluble reagents, or water-soluble ones, or reagents having both oil and water-solubility may be mixed with sulfur dioxide extract.

In practising my process, a treating agent or demulsifying agent of the kind above described may be brought in contact with the emulsion to be treated in any of the numerous ways now employed in the treatment of petroleum emulsions of the water-in-oil type with chemical demulsifying agents, such, for example, as by introducing the treating agent into the well in which the emulsion is produced, introducing the treating agent into a conduit through which the emulsion is flowing, introducing the treating agent into a tank in which the emulsion is stored, or introducing the treating agent into a container that holds a sludge obtained from the bottom of an oil storage tank. In some instances, it may be advisable to introduce the treating agent into a producing well in such a way that it will become mixed with water and oil that are emerging from the surrounding strata, before said water and oil enters the barrel of the well pump or the tubing up through which said water and oil flow to the surface of the ground. After treatment the emulsion is allowed to stand in a quiescent state, usually in a settling tank, at a temperature varying from atmospheric temperature to about 200° F., so as to permit the water or brine to separate from the oil, it being preferable to keep the temperature low enough so as to prevent the valuable constituents of the oil from volatilizing. If desired, the treated emulsion may be acted upon by one or the other of various kinds of apparatus now used in the operation of breaking petroleum emulsions, such as homogenizers, hay tanks, gun barrels, filters, centrifuges, or electrical dehydrators.

The amount of treating agent on the anhydrous basis that is required to break the emulsion may vary from approximately 1 part of treating agent to 1500 parts of emulsion, up to a ratio of 1 part of treating agent to 30,000 parts of emulsion, depending upon the type or kind of emulsion being treated. In treating exceptionally refractory emulsions of the kind commonly referred to as "tank bottoms" or "residual pit oils", the minimum ratio above referred to is often necessary, but in treating fresh emulsions, i. e., emulsions that will yield readily to the action of chemical demulsifying agents, the maximum ratio above mentioned will frequently produce highly satisfactory results. For the average petroleum emulsion of the water-in-oil type a ratio of 1 part of treating agent to 10,000 parts of emulsion will usually be found to produce commercially satisfactory results.

Having thus described my invention, what I claim as new and desire to secure by Letters Patent is:

1. A process for breaking a petroleum emulsion of the water-in-oil type, which consists in subjecting the emulsion to the action of a demulsifying agent, comprising a chemical compound containing at least one polybasic carboxy acid residue, and at least one long chain reactive hydrocarbon residue derived from a hydrocarbon body or radical whose activity is due to an alcoholiform hydroxyl or an acid hydrogen, and having not less than 10 carbon atoms and not more than 26 carbon atoms, in admixture with sulfur dioxide extract.

2. A process for breaking a petroleum emulsion of the water-in-oil type, which consists in subjecting the emulsion to the action of a water-soluble demulsifying agent, comprising a chemical compound containing at least one polybasic carboxy acid residue, and at least one long chain reactive hydrocarbon residue derived from a hydrocarbon body or radical whose activity is due to an alcoholiform hydroxy or an acid hydrogen, and having not less than 10 carbon atoms and not more than 26 carbon atoms, in admixture with sulfur dioxide extract.

3. A process for breaking a petroleum emulsion of the water-in-oil type, which consists in subjecting the emulsion to the action of an oil-soluble demulsifying agent, comprising a chemical compound containing at least one polybasic carboxy acid residue, and at least one long chain reactive hydrocarbon residue derived from a hydrocarbon body or radical whose activity is due to an alcoholiform hydroxy or an acid hydrogen, and having not less than 10 carbon atoms and not more than 26 carbon atoms, in admixture with sulfur dioxide extract.

4. A process for breaking a petroleum emulsion of the water-in-oil type, which consists in subjecting the emulsion to the action of a demulsifying agent, comprising a water-soluble chemical compound containing at least one polybasic carboxy acid residue derived from a hydrocarbon body or radical whose activity is due to an alcoholiform hydroxyl or an acid hydrogen, and having not less than 10 carbon atoms and not more than 26 carbon atoms, and at least one long chain reactive hydrocarbon residue, in admixture with sulfur dioxide extract, without aqueous dilution prior to use.

5. A process for breaking a petroleum emulsion of the water-in-oil type, which consists in subjecting the emulsion to the action of a demulsifying agent, comprising a chemical compound, containing at least one polybasic carboxy acid residue, and at least one polyhydric alcohol residue, and also at least one long chain reactive hydrocarbon residue derived from a hydrocarbon body or radical whose activity is due to an alcoholiform hydroxyl or an acid hydrogen, and having not less than 10 carbon atoms and not more than 26 carbon atoms, in admixture with sulfur dioxide extract.

6. A process for breaking a petroleum emulsion of the water-in-oil type, which consists in subjecting the emulsion to the action of a demulsifying agent, comprising a chemical compound, containing at least one polybasic carboxy acid residue and at least one polyhydric alcohol residue of the ether alcohol type, and also at least one long chain reactive hydrocarbon residue derived from a hydrocarbon body or radical whose activity is due to an alcoholiform hydroxyl or an acid hydrogen, and having not less than 10 carbon atoms and not more than 26 carbon atoms, in admixture with sulfur dioxide extract.

7. A process for breaking a petroleum emulsion of the water-in-oil type, which consists in subjecting the emulsion to the action of a demulsifying agent, comprising a chemical compound, containing at least one polybasic carboxy acid residue, and at least one polyhydric alcohol residue of the ether alcohol type derived from glycerol, and also at least one long chain reactive hydrocarbon residue derived from a hydrocarbon body or radical whose activity is due to an alcoholiform hydroxyl or an acid hydrogen, and having not less than 10 carbon atoms and not more than 26 carbon atoms, in admixture with sulfur dioxide extract.

8. A process for breaking a petroleum emulsion of the water-in-oil type, which consists in subjecting the emulsion to the action of a demulsifying agent, comprising a chemical compound containing at least one polybasic carboxy acid residue, and at least one long chain reactive hydrocarbon residue derived from a hydrocarbon body or radical whose activity is due to an alcoholiform hydroxyl or an acid hydrogen, and having not less than 10 carbon atoms and not more than 26 carbon atoms, in admixture with sulfur dioxide extract, within the ratio range of 1 to 4 and 4 to 1.

9. A process for breaking a petroleum emulsion of the water-in-oil type, which consists in subjecting the emulsion to the action of a water-soluble demulsifying agent, comprising a chemical compound containing at least one polybasic carboxy acid residue, and at least one long chain reactive hydrocarbon residue derived from a hydrocarbon body or radical whose activity is due to an alcoholiform hydroxyl or an acid hydrogen, and having not less than 10 carbon atoms and not more than 26 carbon atoms, in admixture with sulfur dioxide extract, within the ratio range of 1 to 4 and 4 to 1.

10. A process for breaking a petroleum emulsion of the water-in-oil type, which consists in subjecting the emulsion to the action of an oil-soluble demulsifying agent, comprising a chemical compound containing at least one polybasic carboxy acid residue, and at least one long chain reactive hydrocarbon residue derived from a hydrocarbon body or radical whose activity is due to an alcoholiform hydroxyl or an acid hydrogen, and having not less than 10 carbon atoms and not more than 26 carbon atoms, in admixture with sulfur dioxide extract, within the ratio range of 1 to 4 and 4 to 1.

11. A process for breaking a petroleum emulsion of the water-in-oil type, which consists in subjecting the emulsion to the action of a demulsifying agent, comprising a chemical compound containing at least one polybasic carboxy acid residue, and at least one long chain reactive hydrocarbon residue derived from a hydrocarbon body or radical whose activity is due to an alcoholiform hydroxyl or an acid hydrogen, and having not less than 10 carbon atoms and not more than 26 carbon atoms, in admixture with sulfur dioxide extract having a specific gravity of approximately 0.90 at 60° F. and a boiling range of 360° F. to over 490° F.

12. A process for breaking a petroleum emulsion of the water-in-oil type, which consists in subjecting the emulsion to the action of a water-soluble demulsifying agent, comprising a chemical compound containing at least one polybasic carboxy acid residue, and at least one long chain reactive hydrocarbon residue derived from a hydrocarbon body or radical whose activity is due to an alcoholiform hydroxyl or an acid hydrogen, and having not less than 10 carbon atoms and not more than 26 carbon atoms, in admixture with sulfur dioxide extract having a specific gravity of approximately 0.90 at 60° F., and a boiling range of 360° F, to over 490° F.

13. A process for breaking a petroleum emulsion of the water-in-oil type, which consists in subjecting the emulsion to the action of an oil-soluble demulsifying agent, comprising a chemical compound containing at least one polybasic carboxy acid residue, and at least one long chain reactive hydrocarbon residue derived from a hydrocarbon body or radical whose activity is due to an alcoholiform hydroxyl or an acid hydrogen, and having not less than 10 carbon atoms and not more than 26 carbon atoms, in admixture with sulfur dioxide extract having a specific gravity of approximately 0.90 at 60° F., and a boiling range of 360° F. to over 490° F.

14. A process for breaking a petroleum emulsion of the water-in-oil type, which consists in subjecting the emulsion to the action of a demulsifying agent, comprising a chemical compound containing at least one polybasic carboxy acid residue, and at least one castor oil residue, in admixture with sulfur dioxide extract.

15. A process for breaking a petroleum emulsion of the water-in-oil type, which consists in subjecting the emulsion to the action of a demulsifying agent, comprising a chemical compound containing at least one phthalic acid residue, and at least one castor oil residue, in admixture with sulfur dioxide extract.

16. A process for breaking a petroleum emulsion of the water-in-oil type, which consists in subjecting the emulsion to the action of a demulsifying agent, comprising a chemical compound containing at least one phthalic acid residue, and at least one castor oil residue and at least one polyglycerol residue, in admixture with sulfur dioxide extract.

17. A process for breaking a petroleum emulsion of the water-in-oil type, which consists in subjecting the emulsion to the action of a demulsifying agent, comprising a chemical compound containing at least one phthalic acid residue, and at least one castor oil residue, and at least one polyglycerol residue, in admixture with sulfur dioxide extract and denatured alcohol in amount not to exceed one-half the weight of the sulfur dioxide extract.

18. A process for breaking a petroleum emulsion of the water-in-oil type, which consists in subjecting the emulsion to the action of a demulsifying agent comprising a chemical compound containing at least one polybasic carboxy acid residue and at least one long chain reactive hydrocarbon residue, derived from a hydrocarbon body or radical whose activity is due to an alcoholiform hydroxyl or an acid hydrogen and having not less than 10 carbon atoms and not more than 26 carbon atoms, the said chemical compound being mixed with extract obtained by sulfur dioxide extraction and having a specific gravity of approximately 0.90 at 60° F. and a boiling range of 360° F. to over 490° F., the said mixture of chemical compound and extract being within the ratio of 1 to 4 and 4 to 1.

19. A process for breaking a petroleum emulsion of the water-in-oil type, which consists in subjecting the emulsion to the action of a water-soluble demulsifying agent comprising a chemical compound containing at least one polybasic carboxy acid residue and at least one long chain reactive hydrocarbon residue, derived from a hydrocarbon body or radical whose activity is due to an alcoholiform hydroxyl or an acid hydrogen and having not less than 10 carbon atoms and not more than 26 carbon atoms, the said chemical compound being mixed with extract obtained by sulfur dioxide extraction and having a specific gravity of approximately 0.90 at 60° F. and a boiling range of 360° F. to over 490° F., the said mixture of chemical compound and extract being within the ratio of 1 to 4 and 4 to 1.

20. A process for breaking a petroleum emulsion of the water-in-oil type, which consists in subjecting the emulsion to the action of an oil-soluble demulsifying agent comprising a chemical compound containing at least one polybasic carboxy acid residue and at least one long chain reactive hydrocarbon residue, derived from a hydrocarbon body or radical whose activity is due to an alcoholiform hydroxyl or an acid hydrogen and having not less than 10 carbon atoms and not more than 26 carbon atoms, the said chemical compound being mixed with extract obtained by sulfur dioxide extraction and having a specific gravity of approximately 0.90 at 60° F. and a boiling range of 360° F. to over 490° F., the said mixture of chemical compound and extract being within the ratio of 1 to 4 and 4 to 1.

CLAUDIUS H. M. ROBERTS.